(12) United States Patent
Li et al.

(10) Patent No.: US 11,556,761 B2
(45) Date of Patent: Jan. 17, 2023

(54) METHOD AND DEVICE FOR COMPRESSING A NEURAL NETWORK MODEL FOR MACHINE TRANSLATION AND STORAGE MEDIUM

(71) Applicant: Beijing Xiaomi Intelligent Technology Co., Ltd., Beijing (CN)

(72) Inventors: Xiang Li, Beijing (CN); Yuhui Sun, Beijing (CN); Jingwei Li, Beijing (CN); Jialiang Jiang, Beijing (CN)

(73) Assignee: Beijing Xiaomi Intelligent Technology Co., Ltd., Beijing (CN)

( * ) Notice: Subject to any disclaimer, the term of this patent is extended or adjusted under 35 U.S.C. 154(b) by 420 days.

(21) Appl. No.: 16/828,277

(22) Filed: Mar. 24, 2020

(65) Prior Publication Data

US 2021/0158126 A1 May 27, 2021

(30) Foreign Application Priority Data

Nov. 25, 2019 (CN) .......................... 201911167600.6

(51) Int. Cl.
G06N 3/04 (2006.01)
G06F 17/18 (2006.01)
G06N 3/08 (2006.01)
G06F 40/58 (2020.01)

(52) U.S. Cl.
CPC ........... *G06N 3/0454* (2013.01); *G06F 17/18* (2013.01); *G06F 40/58* (2020.01); *G06N 3/08* (2013.01)

(58) Field of Classification Search
CPC ....... G06F 17/18; G06F 40/58; G06N 3/0454; G06N 3/08
See application file for complete search history.

(56) References Cited

U.S. PATENT DOCUMENTS

2017/0083829 A1* 3/2017 Kang ................... G06N 3/0454
2019/0325308 A1 10/2019 Chung et al.
2020/0272940 A1* 8/2020 Sun ..................... G06F 21/6245

OTHER PUBLICATIONS

J. Xu, J. Hou, Y. Song, W. Guo and L. Dai, "Knowledge Distillation from Multilingual and Monolingual Teachers for End-to-End Multilingual Speech Recognition,", 2019, 2019 Asia-Pacific Signal and Information Processing Association Annual Summit and Conference (APSIPA ASC), pp. 844-849, (Year: 2019).*

(Continued)

*Primary Examiner* — Eric Yen
(74) *Attorney, Agent, or Firm* — Finnegan, Henderson, Farabow, Garrett & Dunner, L.L.P.

(57) ABSTRACT

A method for compressing a neural network model includes: obtaining a first trained teacher model and a second trained teacher model based on N training samples, N being a positive integer greater than 1; for each of the N training samples, determining a first guide component of the first teacher model and a second guide component of the second teacher model respectively, determining a sub optimization target corresponding to the training sample and configured to optimize a student model according to the first guide component and the second guide component, and determining a joint optimization target based on each of the N training samples and a sub optimization target corresponding to the training sample; and training the student model based on the joint optimization target.

20 Claims, 7 Drawing Sheets

(56) References Cited

OTHER PUBLICATIONS

X. Liang, L. Wu, J. Li, T. Qin, M. Zhang and T.-Y. Liu, "Multi-Teacher Distillation With Single Model for Neural Machine Translation," 2022, in IEEE/ACM Transactions on Audio, Speech, and Language Processing, vol. 30, pp. 992-1002 (Year: 2022).*
First Office Action in Japanese Application No. 2020-069723, dated Jun. 22, 2021.
Shan You et al.; Learning from Multiple Teacher Networks, KDD 2017 Research Paper, KDD'17 Aug. 13-17, 2017, Halifax, NS, Canada, 10 pages.
Felix Stahlberg, The Roles of Language Models and Hierarchical Models in Neural Sequence-to-Sequence Prediction, Queens' College, Sep. 2019, 366 pages.
Xingjian Chen et al., A Two-Teacher Framework for Knowledge Distillation, Advances in Databases and Information Systems, Springer International Publishing, Jun. 26, 2019, 9 pages.
Siqi Sun et al., Patient Knowledge Distillation for BERT Model Compression, Microsoft Dynamics 365 AI Research, Ithaca, NY, Aug. 25, 2019, 10 pages.
Felix Stahlberg, Neural Machine Translation: A Review, University of Cambridge, Engineering Department, UK, Ithaca, NY, Dec. 4, 2019, 88 pages.
Supplementary European Search Report in the European Application No. 20168519.5, dated Sep. 30, 2020.
Long Zhou et al., Synchronous Bidirectional Neural Machine Translation, Transactions of the Association for Computational Linguistics, vol. 7, pp. 91-105, 2019.
Lemao Liu et al., Agreement on Target-bidirectional Neural Machine Translation, NAACL-HLT, San Diego, CA, Jun. 12-17, 2016, pp. 411-416.
Xiangwen Zhang et al., Asynchronous Bidirectional Decoding for Neural Machine Translation, Association for the Advancement of Artificial Intelligence, Feb. 3, 2018, 9 pages.
Yoon Kim et al., Sequence-Level Knowledge Distillation, School of Engineering and Applied Sciences, Harvard University, Cambridge, MA, Sep. 22, 2016, 11 pages.

\* cited by examiner

METHOD AND DEVICE FOR COMPRESSING A NEURAL NETWORK MODEL FOR MACHINE TRANSLATION AND STORAGE MEDIUM

CROSS-REFERENCE TO RELATED APPLICATIONS

This application is filed based upon and claims priority to Chinese Patent Application No. 201911167600.6, filed on Nov. 25, 2019, the entire content of which is incorporated herein by reference.

TECHNICAL FIELD

The present disclosure generally relates to the technical field of computer technologies, and more particularly, to a method and device for compressing a neural network model for machine translation and a storage medium.

BACKGROUND

High performance of neural-network-based deep learning has been achieved in multiple machine learning tasks such as image classification, machine translation and voice recognition, and neural network model-based machine translation has become a present mainstream machine translation method and has high academic and market value.

At present, compressing a complex neural network model efficiently to reduce a model storage overhead, increase a model-based reasoning speed and simultaneously reduce damage caused by compression to translation quality becomes a key technology for application of a neural network model for machine translation to a mobile terminal and is also a hot spot of academic and industrial researches.

In related art, compressing a neural network model for machine translation by use of a knowledge distillation method may not only reduce model complexity but also alleviate the problem of prediction precision reduction caused by model compression, and becomes a present mainstream method for compressing a neural network model. Compressing a neural network model in a knowledge distillation manner may be understood as guiding training of a small model by use of a high-accuracy large model, the large model may also be referred to as a teacher model, and the small model may also be referred to as a student model. Multiple student models may be trained by use of a teacher model.

However, a conventional knowledge distillation method for compressing a neural network model is relatively low in information migration accuracy, further resulting in relatively low translation quality of a student model, relatively poor translation effect of neural network model-based machine translation in a mobile terminal and influence on user experience.

SUMMARY

According to a first aspect of embodiments of the present disclosure, a method for compressing a neural network model for machine translation includes: obtaining a first trained teacher model and a second trained teacher model based on N training samples, N being a positive integer greater than 1; for each of the N training samples, determining a first guide component of the first teacher model and a second guide component of the second teacher model respectively, determining a sub optimization target corresponding to the training sample and configured to optimize a student model according to the first guide component and the second guide component, and determining a joint optimization target based on each of the N training samples and a sub optimization target corresponding to the training sample; and training the student model based on the joint optimization target.

According to a second aspect of the embodiments of the present disclosure, a device for compressing a neural network model for machine translation includes: a processor; and a memory configured to store an instruction executable by the processor, wherein the processor is configured to: obtain a first trained teacher model and a second trained teacher model based on N training samples, N being a positive integer greater than 1; for each of the N training samples, determine a first guide component of the first teacher model and a second guide component of the second teacher model respectively, determine a sub optimization target corresponding to the training sample and configured to optimize a student model according to the first guide component and the second guide component and determine a joint optimization target based on each of the N training samples and a sub optimization target corresponding to the training sample; and train the student model based on the joint optimization target.

According to a third aspect of the embodiments of the present disclosure, a non-transitory computer-readable storage medium has stored therein instructions that, when executed by a processor of a device, cause the device to perform the method for compressing a neural network model according to the first aspect.

It is to be understood that the above general description and detailed description below are only exemplary and explanatory and not intended to limit the present disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure as recited in the appended claims.

In embodiments of the present disclosure, a method for compressing a neural network model for machine translation is applied to training of a student model with bilingual parallel sentence pairs. The student model may be a knowledge distillation neural network model deployed for machine translation in a mobile terminal. The student model deployed for machine translation in the mobile terminal has network structure complexity far lower than that of a teacher model deployed in a cloud server for machine translation and may reduce a parameter scale and increase a decoding speed, but translation quality of the student module may also be reduced due to reduction of a model capacity.

In view of this, the embodiments of the present disclosure provide a method for compressing a neural network model for machine translation. Two teacher models are trained based on N training samples respectively, for each training sample in the N training samples, a joint optimization target of the training sample is determined by use of two guide components associated with the two teacher models, and a student model is trained based on each training sample in the N training samples and the corresponding joint optimization target thereof, so that knowledge of the teacher models may be migrated into the student model more efficiently, and translation quality of the student model may be improved.

In an embodiment, the two teacher models are respectively trained based on the N training samples of which source language ends are the same and target language sequences are mutually inverse. For example, a left-to-right (L2R) teacher model and a right-to-left (R2L) teacher model may be trained respectively by use of N L2R training samples and N R2L training samples as well as a negative log-likelihood (NLL) loss function that is taken as an optimization target.

In the present disclosure, for convenient description, one of the two teacher models is referred to as a first teacher model, and the other of the two teacher models is referred to as a second teacher model. Guide information of the first teacher model for the student model is referred to as a first guide component, and guide information of the second teacher model for the student model is referred to as a second guide component.

Figure 1:
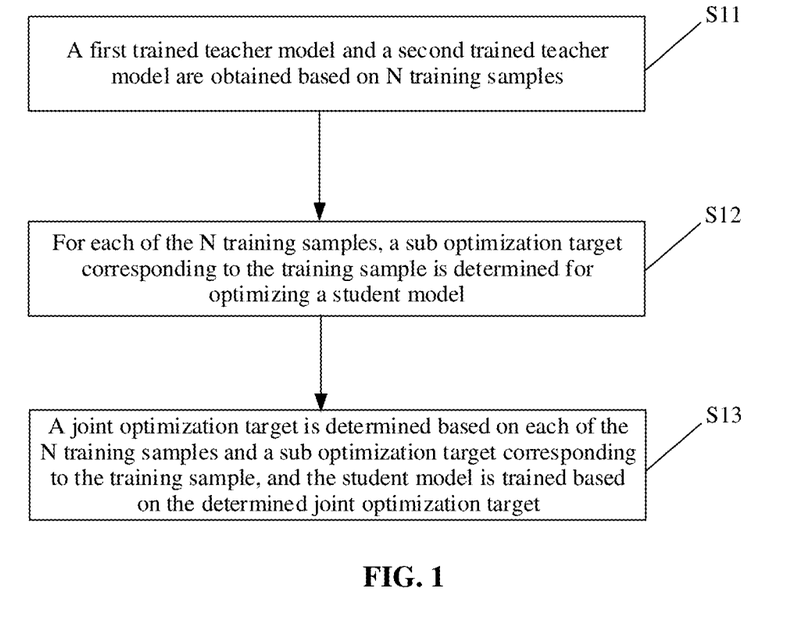
FIG. 1 is a flow chart illustrating a method for compressing a neural network model for machine translation, according to an exemplary embodiment.

FIG. 1 is a flow chart illustrating a method for compressing a neural network model for machine translation, according to an exemplary embodiment. As illustrated in FIG. 1, the method for compressing a neural network model for machine translation is applied to a mobile terminal and includes the following steps.

In S11, a first trained teacher model and a second trained teacher model are obtained based on N training samples. N is a positive integer greater than 1.

In an embodiment, the N training samples are training samples of which source language ends are the same and target language sequences are mutually inverse. For example, the nth training sample in the N training samples includes a bilingual sentence pair formed by an nth source language sequence and an nth target language sequence, n being any positive integer more than or equal to 1 and less than or equal to N. The nth target language sequence includes M target vocabularies, M being a positive integer greater than 1.

In S12, for each training sample in the N training samples, a corresponding sub optimization target configured to optimize a student model is determined.

Figure 2:
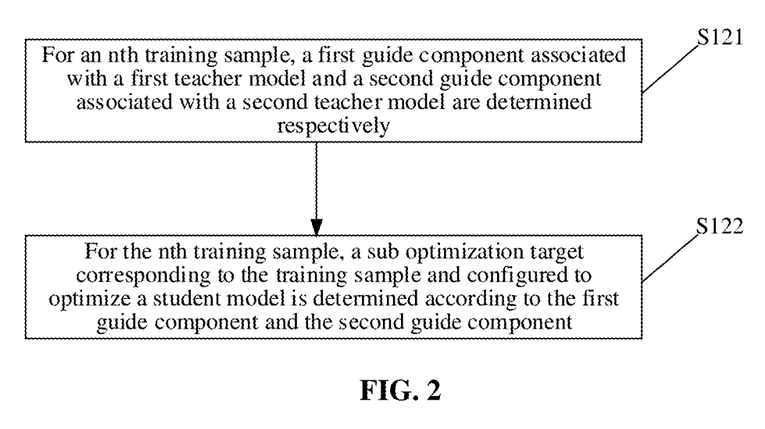
FIG. 2 is a flow chart illustrating a method for determining a joint optimization target corresponding to a training sample, according to an exemplary embodiment.

FIG. 2 is a flow chart illustrating a method for determining a sub optimization target corresponding to the training sample, according to an exemplary embodiment.

In S121, for the nth training sample, a first guide component of the first teacher model and a second guide component of the second teacher model are determined respectively.

In S122, for the nth training sample, the sub optimization target corresponding to the training sample and configured to optimize the student model is determined according to the first guide component and the second guide component.

In the embodiment, the sub optimization target may be understood as a distillation loss function for joint optimization of the student model by the first teacher model and the second teacher model. The distillation loss function may be, for example, a KL divergence loss function (also referred to as a relative entropy loss function).

In S13, a joint optimization target is determined based on each of the N training samples and a sub optimization target corresponding to the training sample, and the student model is trained based on the determined joint optimization target.

According to the embodiment, the first teacher model and the second teacher model are trained based on the N training samples respectively, for each training sample in the N training samples, the sub optimization target of the training sample is determined based on the first guide component of the first teacher model and the second guide component of the second teacher, the joint optimization target is determined based on the sub optimization target of each training sample in the N training samples, and the student model is trained based on the joint optimization target, so that knowledge of the teacher models may be migrated into the student model more efficiently, and translation quality of the student model may be improved.

In an embodiment, the nth training sample in the N training samples includes a bilingual sentence pair formed by an nth source language sequence and an nth target language sequence, and the nth target language sequence includes M target vocabularies.

Figure 3:
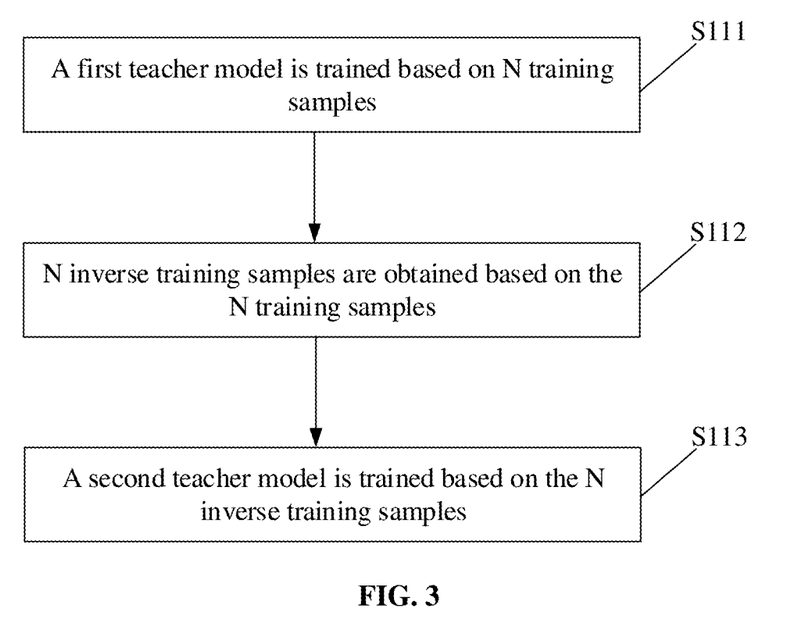
FIG. 3 is a flow chart illustrating a method for training a first teacher model and a second teacher model, according to an exemplary embodiment.

The first trained teacher model and the second trained teacher model may be obtained based on the N training samples. FIG. 3 is a flow chart illustrating a method for training a first teacher model and a second teacher model, according to an exemplary embodiment. Referring to FIG. 3, the method includes the following steps.

In S111, the first teacher model is trained based on the N training samples.

In the embodiment, a training sample including N bilingual sentence pairs may be expressed as follows:

$$D_{x\vec{y}}^{N} = \{(x_1, \vec{y}_1), \ldots, (x_N, \vec{y}^N)\}.$$

A coder-decoder-based neural machine translation architecture is adopted to train an L2R teacher model, namely obtaining the first teacher model.

In S112, N inverse training samples are obtained based on the N training samples. An nth inverse target language sequence in the nth inverse training sample is an inverse sequence of the nth target language sequence in the nth training sample.

For example, in the embodiment, R2L training data of the target language sequence is created based on $D_{x,\vec{y}}^N$:

$$D_{x,\overleftarrow{y}}^N = \{(x_1, \overleftarrow{y}_1), \ldots, (x_N, \overleftarrow{y}_N)\}.$$

where $\overleftarrow{y}$ is an inverse sequence of $\vec{y}$. For example, if $\vec{y}_n = \{y_n^1, y_n^2, y_n^3\}$, $\overleftarrow{y}_n = \{y_n^3, y_n^2, y_n^1\}$.

In S113, the second teacher model is trained based on the N inverse training samples.

In the embodiment, an R2L teacher model may be trained based on the data $D_{x,\overleftarrow{y}}^N$ according to a training manner for the L2R teacher model, to obtain the second teacher model.

In the embodiment, the first teacher model and second teacher model obtained have their respective optimization targets.

Since $D_{x,\vec{y}}^N$ and $D_{x,\overleftarrow{y}}^N$ have the same target language word list (a size is |V|), for the training samples $(x, \vec{y})$ and $(x, \overleftarrow{y})$ with the same source language x, cross entropy, loss functions of the L2R teacher model and the R2L teacher model may be determined as the training optimization targets of respective optimization.

In an embodiment, for the nth training sample, the sub optimization target of optimization of the L2R teacher model may be determined by use of a formula 1, and the optimization target of optimization of the L2R teacher model is determined based on the sub optimization target of each training sample in the N training samples. In an embodiment, the optimization target of optimization of the L2R teacher model is represented by a formula 2, $$\mathcal{L}_{NLL}(\theta_{l2r\_teacher})_n = -\Sigma_{j=1}^{J_n}\Sigma_{k=1}^{|V|} \mathbb{1}\{\vec{y}_n^j = k\} \times \log P(\vec{y}_n^j = k | x_n; \theta_{l2r\_teacher}) \quad \text{Formula 1:}$$

$$\mathcal{L}_{NLL}(\theta_{l2r\_teacher})_{sum} = \Sigma_{n=1}^N \mathcal{L}_{NLL}(\theta_{l2r\_teacher})_n. \quad \text{Formula 2:}$$

In an embodiment, for the nth inverse training sample, the sub optimization target of optimization of the R2L teacher model may be determined by use of a formula 3, and the optimization target of optimization of the R2L teacher model is determined based on the sub optimization target of each training sample in the N training samples. In an embodiment, the optimization target of optimization of the R2L teacher model is represented by a formula 4.

$$\mathcal{L}_{NLL}(\theta_{r2l\_teacher})_n = -\Sigma_{j=1}^{J_n}\Sigma_{k=1}^{|V|} \mathbb{1}\{\overleftarrow{y}_n^j = k\} \times \log P(\overleftarrow{y}_n^j = k | x_n; \theta_{r2l\_teacher}). \quad \text{Formula 3:}$$

$$\mathcal{L}_{NLL}(\theta_{r2l\_teacher})_{sum} = \Sigma_{n=1}^N \mathcal{L}_{NLL}(\theta_{r2l\_teacher})_n. \quad \text{Formula 4:}$$

In the formulas, $\mathbb{1}$ is an indicator function, N represents the number of the training data samples, $J_n$ represents a length of the target language sequence of the nth training sample, and |V| represents the size of the target language word list of the training sample.

According to embodiments of the present disclosure, after the first teacher model and the second teacher model are trained, the first guide component of the first teacher model and the second guide component of the second teacher may be determined for each training sample in the N training samples respectively.

Figure 4:
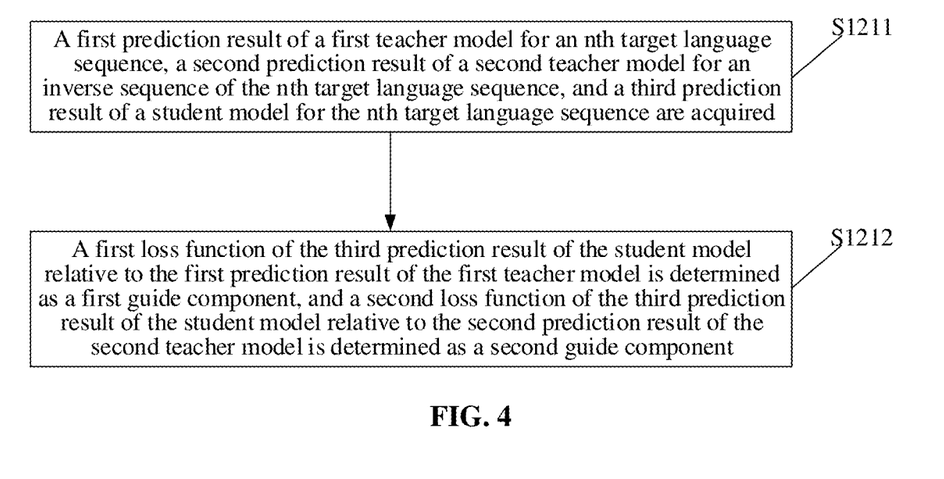
FIG. 4 is a flow chart illustrating a guide component determination method, according to an exemplary embodiment.

FIG. 4 is a flow chart of a method for the nth training sample in the N training samples to determine the first guide component of the first teacher model and the second guide component of the second teacher model, according to an exemplary embodiment. Referring to FIG. 4, the method includes the following steps.

In S1211, a first prediction result of the first teacher model for the nth target language sequence, a second prediction result of the second teacher model for the inverse sequence of the nth target language sequence, and a third prediction result of the student model for the nth target language sequence are acquired.

In the embodiment, when the student model is trained, the nth target language sequence may be predicted by use of the first teacher model, the second teacher model and the student model, and the first guide component and the second guide component are determined according to prediction results. For convenient description, in the present disclosure, the prediction result obtained by predicting the nth target language sequence with the first teacher model is referred to as the first prediction result, the prediction result obtained by predicting the nth target language sequence with the second teacher model is referred to as the second prediction result, and the prediction result of the student model for the nth target language sequence is referred to as the third prediction result.

In S1212, a first loss function of the third prediction result of the student model relative to the first prediction result of the first teacher model is determined as the first guide component, and a second loss function of the third prediction result of the student model relative to the second prediction result of the second teacher model is determined as the second guide component.

In an embodiment, probability distributions of each word of the N training samples and the N inverse training samples at a target language end are obtained by use of the first teacher model and second teacher model that are trained respectively, and the student model is optimized by use of the acquired probability distributions. For example, a sub optimization target is adopted to optimize the student model, the sub optimization target includes three parts of loss functions, the first part of loss function is an NLL loss function, the second part of loss function is a KL divergence loss function of a word probability distribution of the first teacher model and a target language word probability distribution of the student model, and the third part of loss function is a KL divergence loss function of a word probability distribution of the second teacher model and the target language word probability distribution of the student model.

In an embodiment, a probability distribution (referred to as a first probability distribution hereinafter) of the first teacher model when predicting each of target words in the nth target language sequence and a probability distribution (referred to as a second probability distribution hereinafter) of the second teacher model when predicting each of target words in the inverse sequence of the nth target language sequence are determined respectively, a probability distribution (referred to as a third probability distribution hereinafter) of the student model when predicting each of target words in the nth target language sequence is acquired, a first loss function is determined based on the third probability distribution and the first probability distribution, and a second loss function is determined based on the third probability distribution and the second probability distribution.

For example, the first teacher model is the L2R teacher model, and the second teacher model is the R2L teacher model. When the student model is trained and each word in the target language sequence $\vec{y}$ of the training sample $(x, \vec{y})$ is predicted, a probability distribution $P_{student}(\vec{y}_j | x, \vec{y}_{1, \ldots, j-1})$ obtained by the student model for each vocabulary $\vec{y}_j$ in the present target language sequence in the whole target language word list V may be obtained, and namely may be understood as the third probability distribution.

In a training process, a probability distribution $P_{l2r\_teacher}(\vec{y}_j|x, \vec{y}_1 \ldots _{j-1})$ obtained by the L2R teacher model for the sequence $(x, \vec{y})$ may synchronously be obtained and namely may be understood as the first probability distribution.

The first loss function is determined based on the first probability distribution and the second probability distribution. For example, a distillation loss function, i.e., the KL divergence loss function, for optimization of the student model with the L2R teacher model is determined as the first loss function. For example, the first loss function is:

$$\mathcal{L}_{(l2r\_kd)_n} = -\Sigma_{j=1}^{J_n} P_{l2r\_teacher}(\vec{y}_j|x, \vec{y}_1 \ldots _{j-1}) * \log(P_{student}(\vec{y}_j|x, \vec{y}_1 \ldots _{j-1})).$$

Similarly, a distillation loss function, i.e., the KL divergence loss function, for optimization of the student model with the R2L teacher model is determined as the second loss function. For example, the second loss function is:

$$\mathcal{L}_{(r2l\_kd)_n} = -\Sigma_{j=1}^{J_n} P_{r2l\_teacher}(\overleftarrow{y}_{j_n-j+1}|\overleftarrow{y}_1 \ldots _{J_n-j}) * \log(P_{student}(\vec{y}_j|x, \vec{y}_1 \ldots _{j-1})).$$

In an embodiment, for the training sample <x, y> presently used for the student model, if x=<a,b,c> and y=<aa, bb,cc>, the whole target language word list is three words [aa, bb, cc]. For the L2R teacher model, forward prediction is performed once on the sample <x, y>, namely a probability of aa is predicted based on (a, b, c) (since the word list only includes the three words [aa, bb, cc], the predicted probability of aa may be aa:0.9, bb:0.05 and cc:0.05, a probability sum of all the words in the word list being 1), a probability of bb is predicted based on (a, b, c, aa), a probability of cc is finally predicted based on (a, b, c, bb), and these probabilities predicted by the L2R teacher model are represented as $P_{r2l\_teacher}$. Similarly, when the student model is trained based on <x, y> data, the same probability distributions $P_{student}$ of (aa, bb, cc) may also be obtained, and in such case, $\mathcal{L}_{(l2r\_kd)_n} = P_{l2rnumber} * \log(P_{student})$ is adopted as a loss component of the sub optimization target of the student model.

Similarly, for the R2L teacher model, the difference is that a prediction sequence is changed to predict the probability of cc according to (a, b, c), predict the probability of bb according to (a, b, c, cc) and predict the probability of aa according to (a, b, c, bb). Then, inverse operations are executed on the three probabilities in sequence to obtain predicted word distribution probabilities obtained by the R2L teacher model for the y sequence <aa, bb, cc> in the training sample <x, y> used for the student model. Then, a loss component $\mathcal{L}_{(r2l\_kd)_n} = \overleftarrow{P}_{r2l\_teacher} * \log(P_{student})$ of a guide of the R2L teacher model is added into the sub optimization target of the student model.

In the embodiment, when the student model is trained, the training samples of the student model are kept unchanged, and the difference is that, besides the optimization target of the student model, a probability distribution prediction of a teacher model obtained by the first teacher model and the second teacher model based on the same training samples for each word of the target language sequences and the inverse sequences of the target language sequences is also added, and training of the student model is optimized by use of the prediction of the teacher model as an additional supervisory signal. For example, the first guide component and the second guide component are represented as $\mathcal{L}_{(l2r\_kd)_n}$ and $\mathcal{L}_{(r2l\_kd)_n}$ respectively. For the nth training sample, it is determined according to the first guide component and the second guide component that the joint optimization target corresponding to the training sample may be a weighted sum of $\mathcal{L}_{NLL}(\theta_{student})_n$, $\mathcal{L}_{(l2r\_kd)_n}$ and $\mathcal{L}_{(r2l\_kd)_n}$, where $\mathcal{L}_{NLL}(\theta_{student})_n$ is a self-optimization component of the student model for the nth training sample.

In the embodiment, the self-optimization component for the nth training sample is determined in the following manner: an NLL loss function of the student model for the nth training sample is determined based on a length of the target language sequence of the nth training sample and a size of a target language word list of the training sample. The NLL loss function is understood as the self-optimization component.

In the embodiment, a process of determining the NLL loss function for the nth training sample by the student model may refer to a process of determining the optimization target of optimization of the teacher model and will not be elaborated in the embodiment of the present disclosure.

In the embodiment, a weight corresponding to the first guide component is referred to as a first weight, a weight corresponding to the second guide component is referred to as a second weight, and a weight corresponding to the self-optimization component of the student model for the nth training sample is referred to as a third weight.

In an embodiment, the first weight corresponding to the first guide component and the second weight corresponding to the second guide component are determined; the self-optimization component of the student model for the nth training sample is acquired, and the third weight corresponding to the self-optimization component is determined; and weighted summation is performed on the first guide component, the second guide component and the self-optimization component based on the first weight; the second weight and the third weight to obtain the sub optimization target of the nth training sample. That is, the sub optimization target may be a sum of the following three values: a product of $\mathcal{L}_{student}$ and the third weight, a product of $\mathcal{L}_{l2r\_kd}$ and the first weight and a product of $\mathcal{L}_{r2l\_kd}$ and the second weight.

In the embodiment, the first weight, the second weight and the third weight are numerical values greater than 0 and less than or equal to 1. The first weight and the second weight are weights for regulating guides of the L2R teacher model and the R2L teacher model for the student model respectively, in an implementation, the third weight is valued to be 1.

For example, the joint optimization target of the student model may be represented as the following formula:

$$\mathcal{L}(\theta_{student})_{sum} = \Sigma_{n=1}^{N}(\mathcal{L}_{NLL}(\theta_{student})_n + \alpha\mathcal{L}_{(l2r\_kd)_n} + \beta\mathcal{L}_{(r2l\_kd)_n}),$$

where $\alpha$ and $\beta$ are the weights for regulating the guides of the L2R teacher model and the R2L teacher model for the student model respectively, and are numerical values greater than 0.

In the embodiment, a sum of $\alpha$ and $\beta$ is 1.

Figure 5:
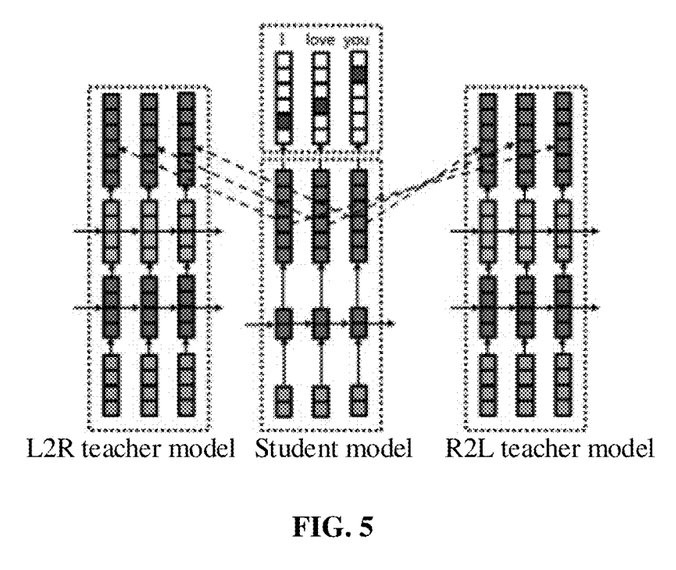
FIG. 5 is a schematic diagram of a two-way knowledge distillation neural machine translation student model training architecture, according to an exemplary embodiment.

In the embodiment, the method for compressing a neural network model involved may be understood for two-way knowledge distillation neural machine translation student model training. FIG. 5 is a schematic diagram of a two-way knowledge distillation neural machine translation student model training architecture, according to an exemplary embodiment.

In FIG. 5, the two teacher models, compared with the student model, have more network layers, and each layer also has more neurons. Except different network structures and model parameter numbers, the teacher models and the student model share the same source language and target language word list.

In the embodiment, the first teacher model and the second teacher model are trained based on the N training samples respectively, for each training sample in the N training samples, the joint optimization target of the training sample is determined by use of the first guide component of the first teacher model and the second guide component of the second teacher, and the student model is trained based on each training sample in the N training samples and the corresponding joint optimization target thereof, so that the knowledge of the teacher models may be migrated into the student model more efficiently, and the translation quality of the student model may be improved.

Embodiments of the present disclosure also provide a device for compressing a neural network model for machine translation. Units of the device may be implemented by hardware, or software, or a combination of hardware and software. Whether a unit is implemented hardware, or software, or a combination of hardware and software depends on specific applications and design constraints.

Figure 6:
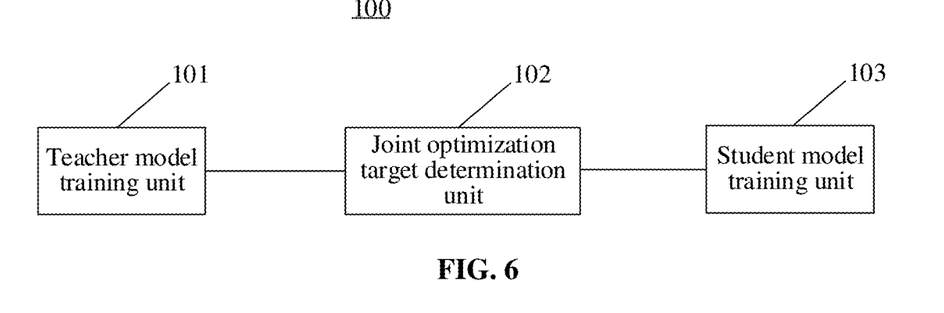
FIG. 6 is a block diagram of a device for compressing a neural network model for machine translation, according to an exemplary embodiment.

FIG. 6 is a block diagram of a device 100 for compressing a neural network model for machine translation, according to an exemplary embodiment. Referring to FIG. 6, the device 100 for compressing a neural network model for machine translation includes a teacher model training unit 101, a joint optimization target determination unit 102, and a student model training unit 103.

The teacher model training unit 101 is configured to obtain a first trained teacher model and a second trained teacher model based on N training samples, N being a positive integer greater than 1. The joint optimization target determination unit 102 is configured to, for each of the N training samples, determine a first guide component of the first teacher model and a second guide component of the second teacher model respectively, determine a sub optimization target corresponding to the training sample and configured to optimize a student model according to the first guide component and the second guide component and determine a joint optimization target based on each of the N training samples and a sub optimization target corresponding to the training sample. The student model training unit 103 is configured to train the student model based on each of the N training samples and the corresponding joint optimization target thereof.

In an embodiment, the nth training sample in the N training samples includes a bilingual sentence pair formed by an nth source language sequence and an nth target language sequence, n being a positive integer more than or equal to 1 and less than or equal to N.

The teacher model training unit 101 is configured to obtain the first trained teacher model and the second trained teacher model based on the N training samples by: training the first teacher model based on the N training samples, obtaining N inverse training samples based on the N training samples, an nth inverse target language sequence in the nth inverse training sample being an inverse sequence of the nth target language sequence in the nth training sample, and training the second teacher model based on the N inverse training samples.

In an embodiment, for the nth training sample, the joint optimization target determination unit 102 is configured to determine the first guide component of the first teacher model and the second guide component of the second teacher model respectively by: acquiring a first prediction result of the first teacher model for the nth target language sequence, a second prediction result of the second teacher model for the inverse sequence of the nth target language sequence and a third prediction result of the student model for the nth target language sequence, determining a first loss function of the third prediction result of the student model relative to the first prediction result of the first teacher model as the first guide component and determining a second loss function of the third prediction result of the student model relative to the second prediction result of the second teacher model as the second guide component.

In an embodiment, the joint optimization target determination unit 102 is configured to determine the first loss function of the third prediction result of the student model relative to the first prediction result of the first teacher model by: acquiring a third probability distribution of the student model when predicting each of target words in the nth target language sequence and a first probability distribution of the first teacher model when predicting each of target words in the nth target language sequence and determining the first loss function based on the third probability distribution and the first probability distribution.

The joint optimization target determination unit 102 is configured to determine the second loss function of the third prediction result of the student model relative to the second prediction result of the second teacher model by: acquiring the third probability distribution of the student model when predicting each of target words in the nth target language sequence and a second probability distribution of the second teacher model when predicting each of target words in the inverse sequence of the nth target language sequence and determining the second loss function based on the third probability distribution and the second probability distribution.

In an embodiment, for the nth training sample, the joint optimization target determination unit 102 is configured to determine the sub optimization get corresponding to the training sample according to the first guide component and the second guide component by: determining a first weight corresponding to the first guide component and a second weight corresponding to the second guide component, acquiring a self-optimization component of the student model for the nth training sample, determining a third weight corresponding to the self-optimization component and performing weighted summation on the first guide component, the second guide component and the self-optimization component based on the first weight, the second weight and the third weight to obtain the sub optimization target.

In an embodiment, a sum of the first weight and the second weight is 1.

In an embodiment, the joint optimization target determination unit 102 determines the self-optimization component of the student model for the nth training sample by: determining an NLL loss function of the student model for the nth training sample based on a length of the target language sequence of the nth training sample and a size of a target language word list of the training sample and determining the NLL loss function as the self-optimization component.

With respect to the device in the above embodiments, the specific manners for performing operations by individual units have been described in detail in the method embodiments, which will not be repeated herein.

Figure 7:
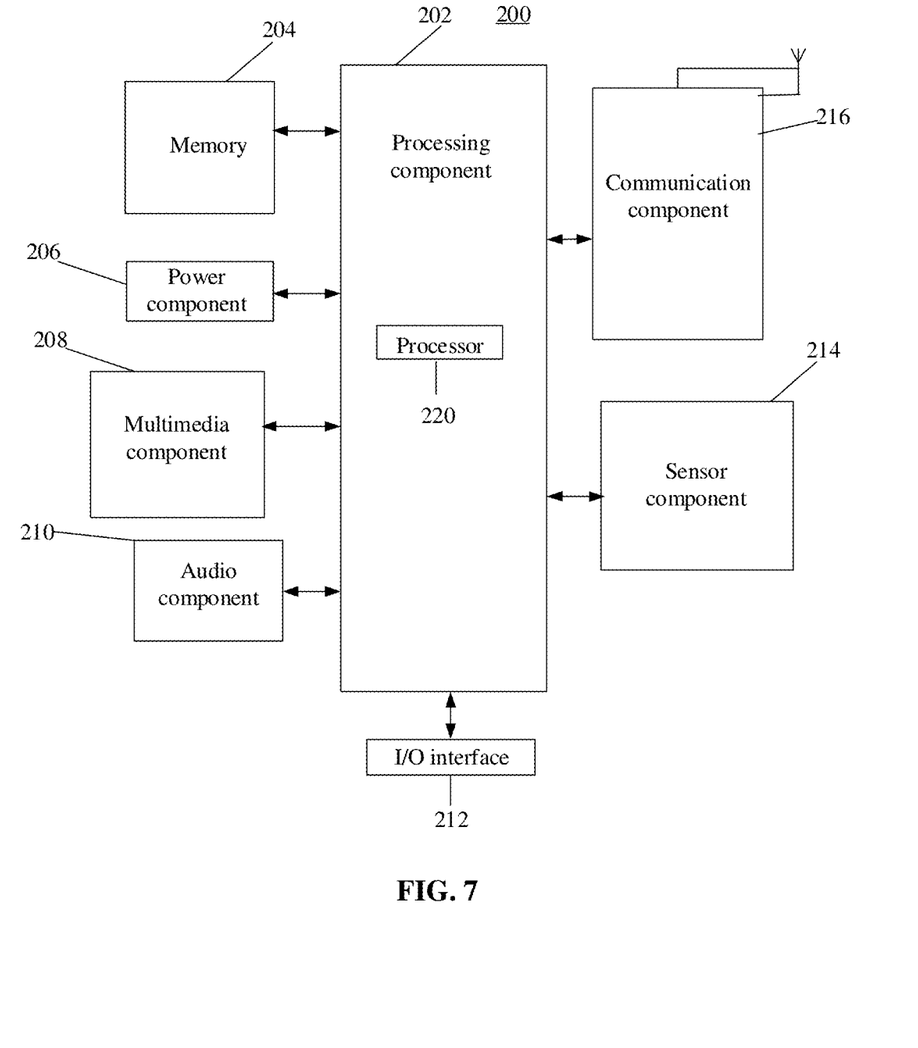
FIG. 7 is a block diagram of a device, according to an exemplary embodiment.

FIG. 7 is a block diagram of a device 200 for compressing a neural network model for machine translation, according to an exemplary embodiment. For example, the device 200 may be a mobile phone, a computer, a digital broadcast terminal, a messaging device, a gaming console, a tablet, a medical device, exercise equipment, a personal digital assistant and the like.

Referring to FIG. 7, the device 200 may include one or more of the following components: a processing component 202, a memory 204, a power component 206, a multimedia component 208, an audio component 210, an Input/Output (I/O) interface 212, a sensor component 214, and a communication component 216.

The processing component 202 typically controls overall operations of the device 200, such as the operations associated with display, telephone calls, data communications, camera operations, and recording operations. The processing component 202 may include one or more processors 220 to execute instructions to perform all or part of the steps in the abovementioned method. Moreover, the processing component 202 may include one or more modules which facilitate interaction between the processing component 202 and the other components. For instance, the processing component 202 may include a multimedia module to facilitate interaction between the multimedia component 208 and the processing component 202.

The memory 204 is configured to store various types of data to support the operation of the device 200. Examples of such data include instructions for any application programs or methods operated on the device 200, contact data, phonebook data, messages, pictures, video, etc. The memory 204 may be implemented by any type of volatile or non-volatile memory devices, or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, and a magnetic or optical disk.

The power component 206 provides power for various components of the device 200. The power component 206 may include a power management system, one or more power supplies, and other components associated with generation, management and distribution of power for the device 200.

The multimedia component 208 includes a screen providing an output interface between the device 200 and a user. In some embodiments, the screen may include a. Liquid Crystal Display (LCD) and a Touch Panel (TP). If the screen includes the TP, the screen may be implemented as a touch screen to receive an input signal from the user. The TP includes one or more touch sensors to sense touches, swipes and gestures on the TP. The touch sensors may not only sense a boundary of a touch or swipe action but also detect a duration and pressure associated with the touch or swipe action. In some embodiments, the multimedia component 208 includes a front camera and/or a rear camera. The front camera and/or the rear camera may receive external multimedia data when the device 200 is in an operation mode, such as a photographing mode or a video mode. Each of the front camera and the rear camera may be a fixed optical lens system or have focusing and optical zooming capabilities.

The audio component 210 is configured to output and/or input an audio signal. For example, the audio component 210 includes a microphone (MIC), and the MIC is configured to receive an external audio signal when the device 200 is in the operation mode, such as a call mode, a recording mode and a voice recognition mode. The received audio signal may further be stored in the memory 204 or sent through the communication component 216. In some embodiments, the audio component 210 further includes a speaker configured to output the audio signal.

The I/O interface 212 provides an interface between the processing component 202 and a peripheral interface module, and the peripheral interface module may be a keyboard, a click wheel, a button and the like. The button may include, but not limited to: a home button, a volume button, a starting button and a locking button.

The sensor component 214 includes one or more sensors configured to provide status assessment in various aspects for the device 200. For instance, the sensor component 214 may detect an on/off status of the device 200 and relative positioning of components, such as a display and small keyboard of the device 200, and the sensor component 214 may further detect a change in a position of the device 200 or a component of the device 200, presence or absence of contact between the user and the device 200, orientation or acceleration/deceleration of the device 200 and a change in temperature of the device 200. The sensor component 214 may include a proximity sensor configured to detect presence of an object nearby without any physical contact. The sensor component 214 may also include a light sensor, such as a Complementary Metal Oxide Semiconductor (CMOS) or Charge Coupled Device (CCD) image sensor, configured for use in an imaging application. In some embodiments, the sensor component 214 may also include an acceleration sensor, a gyroscope sensor, a magnetic sensor, a pressure sensor or a temperature sensor.

The communication component 216 is configured to facilitate wired or wireless communication between the device 200 and other equipment. The device 200 may access a communication-standard-based wireless network, such as a Wireless Fidelity (WiFi) network, a 4th-Generation (4G) or 5th-Generation (5G) network or a combination thereof. In an exemplary embodiment, the communication component 216 receives a broadcast signal or broadcast associated information from an external broadcast management system through a broadcast channel. In an exemplary embodiment, the communication component 216 further includes a Near Field Communication (NFC) module to facilitate short-range communication. In an exemplary embodiment, the communication component 216 may be implemented based on a Radio Frequency identification (RFID) technology, an Infrared. Data. Association (IrDA) technology, an Ultra-WideBand (UWB) technology, a Bluetooth (BT) technology and another technology.

In an exemplary embodiment, the device 200 may be implemented by one or more Application Specific Integrated Circuits (ASICs). Digital Signal Processors (DSPs), Digital Signal Processing Devices (DSPDs), Programmable Logic Devices (PLDs), Field Programmable Gate Arrays (FPGAs), controllers, micro-controllers, microprocessors or other electronic components, and is configured to execute the abovementioned method.

In an exemplary embodiment, there is also provided a non-transitory computer-readable storage medium including an instruction, such as the memory 204 including an instruction, and the instruction may be executed by the processor 220 of the device 200 to implement the abovementioned method. For example, the non-transitory computer-readable storage medium may be a ROM, a Random Access Memory (RAM), a Compact Disc Read-Only Memory (CD-ROM), a magnetic tape, a floppy disc, an optical data storage device and the like.

Terms used in the disclosure are for the purpose of describing exemplary embodiments only, and are not intended to limit the disclosure. For example, the terms "first," "second." and the like are adopted to describe various information but the information is not limited by these terms. These terms are only adopted to distinguish information of the same type and do not represent a specific sequence or importance. For example, without departing from the scope of the present disclosure, first information may also be referred to as second information and, similarly, second information may also be referred to as first information.

Furthermore, although the operations are illustrated in specific sequences in the accompanying drawings, it should not be understood that these operations are required to be executed according to the illustrated specific sequences or in series or all the illustrated operations are required to be executed to obtain expected results. In some embodiments, multiple tasks and parallel processing may be favorable.

Other implementations of the present disclosure will be apparent to those skilled in the art from consideration of the specification and practice of the present disclosure. This application is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes may be made without departing from the scope thereof. It is intended that the scope of the present disclosure only be limited by the appended claims.

What is claimed is:

1. A method for compressing a neural network model for machine translation, comprising:
    obtaining a first trained teacher model and a second trained teacher model based on N training samples, N being a positive integer greater than 1;
    for each of the N training samples, determining a first guide component of the first teacher model and a second guide component of the second teacher model respectively, and determining a sub optimization target corresponding to the training sample and configured to optimize a student model according to the first guide component and the second guide component;
    determining a joint optimization target for the N training samples, based on the N training samples and the sub optimization targets respectively corresponding to the N training samples; and
    training the student model based on the joint optimization target.

2. The method of claim 1, wherein an nth training sample in the N training samples comprises a bilingual sentence pair formed by an nth source language sequence and an nth target language sequence, n being a positive integer greater than or equal to 1 and less than or equal to N, and
    obtaining the first trained teacher model and the second trained teacher model based on the N training samples comprises:
    training the first teacher model based on the N training samples,
    obtaining N inverse training samples based on the N training samples, an nth inverse target language sequence in the nth inverse training sample being an inverse sequence of the nth target language sequence in the nth training sample, and
    training the second teacher model based on the N inverse training samples.

3. The method of claim 2, wherein for the nth training sample, determining the first guide component of the first teacher model and the second guide component of the second teacher model respectively comprises:
    acquiring a first prediction result of the first teacher model for the nth target language sequence, a second prediction result of the second teacher model for the inverse sequence of the nth target language sequence, and a third prediction result of the student model for the nth target language sequence;
    determining a first loss function of the third prediction result of the student model relative to the first prediction result of the first teacher model as the first guide component; and
    determining a second loss function of the third prediction result of the student model relative to the second prediction result of the second teacher model as the second guide component.

4. The method of claim 3, wherein the nth target language sequence includes a first plurality of target words, the inverse sequence of the nth target language sequence includes a second plurality of target words, and determining the first loss function of the third prediction result of the student model relative to the first prediction result of the first teacher model comprises:
    acquiring a third probability distribution of the student model when predicting each of the first plurality of target words in the nth target language sequence, and a first probability distribution of the first teacher model when predicting each of the first plurality of target words in the nth target language sequence, and determining the first loss function based on the third probability distribution and the first probability distribution, and
    determining the second loss function of the third prediction result of the student model relative to the second prediction result of the second teacher model comprises:
    acquiring the third probability distribution of the student model when predicting each of the first plurality of target words in the nth target language sequence, and a second probability distribution of the second teacher model when predicting each of the second plurality of target words in the inverse sequence of the nth target language sequence, and determining the second loss function based on the third probability distribution and the second probability distribution.

5. The method of claim 2, wherein for the nth training sample, determining the sub optimization target corresponding to the training sample according to the first guide component and the second guide component comprises:
    determining a first weight corresponding to the first guide component and a second weight corresponding to the second guide component;
    acquiring a self-optimization component of the student model for the nth training sample, and determining a third weight corresponding to the self-optimization component; and
    performing weighted summation on the first guide component, the second guide component, and the self-optimization component based on the first weight, the second weight, and the third weight to obtain the sub optimization target.

6. The method of claim 5, wherein a sum of the first weight and the second weight is 1.

7. The method of claim 5, wherein the self-optimization component of the student model for the nth training sample is determined by:
   determining a negative log-likelihood (NLL) loss function of the student model for the nth training sample based on a length of a target language sequence of the nth training sample and a size of a target language word list of the nth training sample; and
   determining the NLL loss function as the self-optimization component.

8. A device for compressing a neural network model for machine translation, comprising:
   a processor; and
   a memory configured to store instructions executable by the processor,
   wherein the processor is configured to:
   obtain a first trained teacher model and a second trained teacher model based on N training samples, N being a positive integer greater than 1;
   for each of the N training samples, determine a first guide component of the first teacher model and a second guide component of the second teacher model respectively, and determine a sub optimization target corresponding to the training sample and configured to optimize a student model according to the first guide component and the second guide component;
   determine a joint optimization target for the N training samples, based on the N training samples and the sub optimization targets respectively corresponding to the N training samples; and
   train the student model based on the joint optimization target.

9. The device of claim 8, wherein an nth training sample in the N training samples comprises a bilingual sentence pair formed by an nth source language sequence and an nth target language sequence, n being a positive integer greater than or equal to 1 and less than or equal to N; and the processor is further configured to obtain the first trained teacher model and the second trained teacher model based on the N training samples by:
   training the first teacher model based on the N training samples,
   obtaining N inverse training samples based on the N training samples, an nth inverse target language sequence in the nth inverse training sample being an inverse sequence of the nth target language sequence in the nth training sample, and
   training the second teacher model based on the N inverse training samples.

10. The device of claim 9, wherein the processor is further configured to, for the nth training sample, determine the first guide component of the first teacher model and the second guide component of the second teacher model respectively by:
   acquiring a first prediction result of the first teacher model for the nth target language sequence, a second prediction result of the second teacher model for the inverse sequence of the nth target language sequence, and a third prediction result of the student model for the nth target language sequence,
   determining a first loss function of the third prediction result of the student model relative to the first prediction result of the first teacher model as the first guide component and
   determining a second loss function of the third prediction result of the student model relative to the second prediction result of the second teacher model as the second guide component.

11. The device of claim 10, wherein the nth target language sequence includes a first plurality of target words, the inverse sequence of the nth target language sequence includes a second plurality of target words, and the processor is further configured to:
   determine the first loss function of the third prediction result of the student model relative to the first prediction result of the first teacher model by: acquiring a third probability distribution of the student model when predicting each of the first plurality of target words in the nth target language sequence, and a first probability distribution of the first teacher model when predicting each of the first plurality of target words in the nth target language sequence, and determining the first loss function based on the third probability distribution and the first probability distribution, and
   determine the second loss function of the third prediction result of the student model relative to the second prediction result of the second teacher model by: acquiring the third probability distribution of the student model when predicting each of the first plurality of target words in the nth target language sequence, and a second probability distribution of the second teacher model when predicting each of the second plurality of target words in the inverse sequence of the nth target language sequence, and determining the second loss function based on the third probability distribution and the second probability distribution.

12. The device of claim 9, wherein the processor is further configured to, for the nth training sample, determine the sub optimization target corresponding to the training sample according to the first guide component and the second guide component by:
   determining a first weight corresponding to the first guide component and a second weight corresponding to the second guide component,
   acquiring a self-optimization component of the student model for the nth training sample, determining a third weight corresponding to the self-optimization component and
   performing weighted summation on the first guide component, the second guide component, and the self-optimization component based on the first weight, the second weight, and the third weight to obtain the sub optimization target.

13. The device of claim 12, wherein a sum of the first weight and the second weight is 1.

14. The device of claim 12, wherein the processor is further configured to determine the self-optimization component of the student model for the nth training sample by:
   determining a negative log-likelihood (NLL) loss function of the student model for the nth training sample based on a length of a target language sequence of the nth training sample and a size of a target language word list of the nth training sample; and
   determining the NLL loss function as the self-optimization component.

15. A non-transitory computer-readable storage medium having stored therein instructions that, when executed by a processor of a device, cause the device to perform a method for compressing a neural network model, the method comprising:

obtaining a first trained teacher model and a second trained teacher model based on N training samples, N being a positive integer greater than 1;

for each of the N training samples, determining a first guide component of the first teacher model and a second guide component of the second teacher model respectively, and determining a sub optimization target corresponding to the training sample and configured to optimize a student model according to the first guide component and the second guide component;

determining a joint optimization target for the N training samples, based on the N training samples and the sub optimization targets respectively corresponding to the N training samples; and training the student model based on the joint optimization target.

16. The non-transitory computer-readable storage medium of claim 15, wherein an nth training sample in the N training samples comprises a bilingual sentence pair formed by an nth source language sequence and an nth target language sequence, n being a positive integer greater than or equal to 1 and less than or equal to N, and obtaining the first trained teacher model and the second trained teacher model based on the N training samples comprises:

training the first teacher model based on the N training samples, obtaining N inverse training samples based on the N training samples, an nth inverse target language sequence in the nth inverse training sample being an inverse sequence of the nth target language sequence in the nth training sample, and training the second teacher model based on the N inverse training samples.

17. The non-transitory computer-readable storage medium of claim 16, wherein for the nth training sample, determining the first guide component of the first teacher model and the second guide component of the second teacher model respectively comprises:

acquiring a first prediction result of the first teacher model for the nth target language sequence, a second prediction result of the second teacher model for the inverse sequence of the nth target language sequence and a third prediction result of the student model for the nth target language sequence;

determining a first loss function of the third prediction result of the student model relative to the first prediction result of the first teacher model as the first guide component; and determining a second loss function of the third prediction result of the student model relative to the second prediction result of the second teacher model as the second guide component.

18. The non-transitory computer-readable storage medium of claim 17, wherein the nth target language sequence includes a first plurality of target words, the inverse sequence of the nth target language sequence includes a second plurality of target words, and determining the first loss function of the third prediction result of the student model relative to the first prediction result of the first teacher model comprises:

acquiring a third probability distribution of the student model when predicting each of the first plurality of target words in the nth target language sequence, and a first probability distribution of the first teacher model when predicting each of the first plurality of target words in the nth target language sequence, and determining the first loss function based on the third probability distribution and the first probability distribution, and determining the second loss function of the third prediction result of the student model relative to the second prediction result of the second teacher model comprises:

acquiring the third probability distribution of the student model when predicting each of the first plurality of target words in the nth target language sequence, and a second probability distribution of the second teacher model when predicting each of the second plurality of target words in the inverse sequence of the nth target language sequence, and determining the second loss function based on the third probability distribution and the second probability distribution.

19. The non-transitory computer-readable storage medium of claim 16, wherein for the nth training sample, determining the sub optimization target corresponding to the training sample according to the first guide component and the second guide component comprises:

determining a first weight corresponding to the first guide component and a second weight corresponding to the second guide component;

acquiring a self-optimization component of the student model for the nth training sample, and determining a third weight corresponding to the self-optimization component; and performing weighted summation on the first guide component, the second guide component, and the self-optimization component based on the first weight, the second weight, and the third weight to obtain the sub optimization target.

20. The non-transitory computer-readable storage medium of claim 19, wherein a sum of the first weight and the second weight is 1.

* * * * *